(12) United States Patent
Duo et al.

(10) Patent No.: US 12,069,480 B2
(45) Date of Patent: *Aug. 20, 2024

(54) ELASTIC SECURITY SERVICES LOAD BALANCING IN A WIRELESS MESH NETWORK

(71) Applicant: SONICWALL INC., Milpitas, CA (US)

(72) Inventors: Zhuangzhi Duo, Fremont, CA (US); Atul Dhablania, San Jose, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,152

(22) Filed: Aug. 15, 2023

(65) Prior Publication Data

US 2023/0403558 A1    Dec. 14, 2023

Related U.S. Application Data

(63) Continuation of application No. 17/716,860, filed on Apr. 8, 2022, now Pat. No. 11,729,621, which is a
(Continued)

(51) Int. Cl.
*H04W 12/088* (2021.01)
*G06F 21/62* (2013.01)
(Continued)

(52) U.S. Cl.
CPC ...... *H04W 12/088* (2021.01); *G06F 21/6218* (2013.01); *H04L 67/5682* (2022.05);
(Continued)

(58) Field of Classification Search
CPC ............... H04W 12/088; H04W 12/10; H04W 28/08; H04L 67/5682; G06F 21/6218
See application file for complete search history.

(56) References Cited

U.S. PATENT DOCUMENTS 7,711,605 B1    5/2010   Santeufemia et al.
8,074,279 B1   12/2011   Lin et al.
(Continued)

OTHER PUBLICATIONS

U.S. Appl. No. 16/397,951 Office Action mailed Apr. 29, 2021.
(Continued)

*Primary Examiner* — Viral S Lakhia
(74) *Attorney, Agent, or Firm* — Polsinelli LLP

(57) ABSTRACT

The present disclosure distributes processing capabilities throughout different nodes in a wireless network. Methods and apparatus consistent with the present disclosure increase the efficiency of communications in a wireless network because they help minimize the need to forward communications to other nodes in the network by allowing different wireless nodes to receive and store content ratings regarding requested content in caches associated with respective wireless nodes. Apparatus and methods consistent with the present disclosure perform a load balancing function because they distribute content ratings to different nodes in a wireless network without increasing messaging traffic. As response messages regarding access requests are passed back to a requestor, cache memories at nodes along a communication path are updated to include information that cross-references data identifiers with received content ratings. The cross-referenced data identifiers and content ratings allow each respective wireless node along the communication path to block requests to bad content.

17 Claims, 6 Drawing Sheets

Related U.S. Application Data continuation of application No. 16/397,951, filed on Apr. 29, 2019, now Pat. No. 11,310,665.

(51) Int. Cl.
*H04L 67/5682* (2022.01)
*H04W 12/10* (2021.01)
*H04W 28/08* (2023.01)
*H04W 84/18* (2009.01)

(52) U.S. Cl.
CPC .......... *H04W 12/10* (2013.01); *H04W 28/08* (2013.01); *H04W 84/18* (2013.01)

(56) References Cited

U.S. PATENT DOCUMENTS

| | | | |
|---|---|---|---|
| 8,107,414 B2 * | 1/2012 | Wang | H04W 84/20 455/448 |
| 8,108,933 B2 | 1/2012 | Mahaffey | |
| 8,175,047 B2 | 5/2012 | Seok et al. | |
| 8,230,087 B2 | 7/2012 | Alve | |
| 8,284,744 B2 | 10/2012 | Mukai et al. | |
| 8,620,402 B2 | 12/2013 | Parker, III et al. | |
| 8,695,092 B2 * | 4/2014 | Manianchira | H04L 63/1441 726/22 |
| 8,700,771 B1 | 4/2014 | Ramankutty et al. | |
| 8,745,733 B2 | 6/2014 | Niemela | |
| 8,773,258 B2 | 7/2014 | Vosch et al. | |
| 8,789,195 B2 | 7/2014 | Bianco et al. | |
| 8,893,241 B2 | 11/2014 | Pilouras | |
| 8,902,903 B2 * | 12/2014 | Palchaudhuri | H04W 72/0446 370/406 |
| 8,918,881 B2 | 12/2014 | Bettini et al. | |
| 8,949,978 B1 | 2/2015 | Lin et al. | |
| 8,958,399 B1 | 2/2015 | Bettini et al. | |
| 8,966,582 B1 | 2/2015 | Ainslie | |
| 9,124,636 B1 | 9/2015 | Rathor | |
| 9,270,698 B2 | 2/2016 | Gopal et al. | |
| 9,384,334 B2 | 7/2016 | Burba et al. | |
| 9,449,172 B2 | 9/2016 | Kuenemund et al. | |
| 9,455,959 B1 * | 9/2016 | Garg | H04L 63/0281 |
| 9,509,636 B2 * | 11/2016 | Kalkunte | H04L 47/22 |
| 9,530,000 B2 | 12/2016 | Lange et al. | |
| 9,686,297 B2 | 6/2017 | Starink et al. | |
| 9,747,497 B1 | 8/2017 | Sharma et al. | |
| 9,826,571 B2 * | 11/2017 | Iyer | H04W 84/22 |
| 9,948,649 B1 | 4/2018 | Zhao et al. | |
| 10,111,099 B2 | 10/2018 | Hunt et al. | |
| 10,277,631 B1 | 4/2019 | Gemeniano | |
| 10,320,784 B1 * | 6/2019 | Talmor | H04L 63/1425 |
| 10,713,666 B2 | 7/2020 | Freishtat et al. | |
| 10,802,760 B2 | 10/2020 | Zaretsky et al. | |
| 10,848,440 B2 | 11/2020 | Zhao | |
| 10,957,425 B1 | 3/2021 | Franks et al. | |
| 10,992,678 B1 | 4/2021 | Gilman | |
| 11,062,048 B1 | 7/2021 | Durham et al. | |
| 11,089,103 B1 * | 8/2021 | Parulkar | H04L 67/1097 |
| 11,140,170 B2 | 10/2021 | Barouche et al. | |
| 11,182,810 B1 | 11/2021 | Pandey et al. | |
| 11,232,369 B1 | 1/2022 | Lin et al. | |
| 11,310,665 B2 | 4/2022 | Duo | |
| 11,348,003 B2 | 5/2022 | Adibowo | |
| 11,375,434 B2 * | 6/2022 | Laari | H04W 40/24 |
| 11,392,496 B2 | 7/2022 | Kazi | |
| 11,438,963 B2 | 9/2022 | Duo | |
| 11,449,819 B2 | 9/2022 | Heath | |
| 11,496,511 B1 | 11/2022 | Guo | |
| 11,540,132 B2 | 12/2022 | Duo | |
| 11,729,621 B2 | 8/2023 | Duo et al. | |
| 11,800,598 B2 | 10/2023 | Dou | |
| 11,863,987 B2 | 1/2024 | Duo | |
| 2007/0047543 A1 | 3/2007 | Shin et al. | |
| 2010/0186065 A1 | 7/2010 | Chung et al. | |
| 2011/0078242 A1 | 3/2011 | Davi et al. | |
| 2011/0239287 A1 | 9/2011 | Pak et al. | |
| 2013/0074159 A1 | 3/2013 | Lin et al. | |
| 2013/0139243 A1 | 5/2013 | Poola et al. | |
| 2013/0191904 A1 | 7/2013 | Piliouras | |
| 2013/0254833 A1 | 9/2013 | Nicodemus et al. | |
| 2014/0043985 A1 | 2/2014 | Hall et al. | |
| 2014/0279623 A1 | 9/2014 | Mislove et al. | |
| 2014/0280761 A1 | 9/2014 | Rothschild et al. | |
| 2015/0188964 A1 | 7/2015 | Sharma et al. | |
| 2015/0324555 A1 | 11/2015 | Burba et al. | |
| 2015/0327068 A1 | 11/2015 | Hunt et al. | |
| 2016/0005029 A1 | 1/2016 | Ivey et al. | |
| 2016/0028798 A1 | 1/2016 | Agrawal et al. | |
| 2017/0337596 A1 | 11/2017 | Larkin | |
| 2018/0343200 A1 | 11/2018 | Jana et al. | |
| 2019/0045558 A1 * | 2/2019 | Zhang | H04L 61/5092 |
| 2019/0082224 A1 | 3/2019 | Bradley et al. | |
| 2019/0138720 A1 | 5/2019 | Grewal et al. | |
| 2020/0027093 A1 | 1/2020 | Volk | |
| 2020/0097666 A1 | 3/2020 | Weldemariam et al. | |
| 2020/0344610 A1 | 10/2020 | Duo et al. | |
| 2020/0359349 A1 | 11/2020 | Duo et al. | |
| 2021/0160962 A1 | 5/2021 | Duo | |
| 2021/0176639 A1 | 6/2021 | Duo | |
| 2022/0240091 A1 | 7/2022 | Duo et al. | |
| 2022/0418041 A1 | 12/2022 | Duo | |
| 2023/0209350 A1 | 6/2023 | Duo | |
| 2024/0049358 A1 | 2/2024 | Duo | |

OTHER PUBLICATIONS

U.S. Appl. No. 17/716,860 Office Action mailed Dec. 30, 2022.
U.S. Appl. No. 17/899,959 Office Action mailed Jan. 20, 2023.
U.S. Appl. No. 18/088,273 Office Action mailed Jun. 8, 2023.
U.S. Appl. No. 18/088,273 Notice of Allowance mailed Sep. 28, 2023.
U.S. Appl. No. 18/378,583 Office Action mailed Apr. 24, 2023.

* cited by examiner

ELASTIC SECURITY SERVICES LOAD BALANCING IN A WIRELESS MESH NETWORK

CROSS-REFERENCE TO RELATED APPLICATIONS

This application is a continuation and claims the priority benefit of U.S. patent application Ser. No. 17/716,860 filed Apr. 8, 2022, now U.S. Pat. No. 11,729,621, which is a continuation and claims the priority benefit of U.S. patent application Ser. No. 16/397,951 filed Apr. 29, 2019, now U.S. Pat. No. 11,310,665, the disclosures of which are incorporated herein by reference.

BACKGROUND OF THE INVENTION

Field of Invention

The present disclosure generally relates to increasing the efficiency of a wireless mesh network. More specifically, the present disclosure relates to distributing work amongst different mesh nodes in a wireless mesh network

Description of the Related Art

Every day the use of wireless networks is expanding. Wireless mesh networks commonly use communications consistent with one of the 802.11 wireless communication standards that are commonly referred to as "Wi-Fi." Because of this, 802.11 communication channels are a preferred type of communication channel used in wireless mesh networks.

Wireless networks, like 802.11 have functionality that is split between various different components that may include physical electronic devices and operational software, where each component are commonly referred to as a "layer." Wireless 802.11 networks include at least three layers that include a physical layer, a link layer, and a network layer. This physical layer includes electronic hardware dedicated to receive and transmit signals compatible with an 802.11 wireless data communication standard. The link layer receives processes and data received by the physical layer. The link layer also organizes data to be sent to other devices via the physical layer. The link layer may also send information to operating system software or program applications that may be referred to as higher/upper layers of software within a computing system.

While current wireless networking standards (e.g. 802.11i) specify methods that help secure the wireless link layer of a wireless network, the 802.11 standard does not protect the upper layers of software within a computer system from threats. Such threats include malware, ransomware, computer viruses, and other malicious program code. The 802.11 standard also does not prevent content which may be considered inappropriate or undesired from being delivered to a requesting computer. Furthermore, the 802.11 standard does not prevent or block illegal web content from being accessed by computing devices. Modern data centers commonly use firewall or gateway devices located at the edge of a wireless network to protect an isolated network. These conventional firewalls or gateways isolate computers located within a protected network from computers located outside of the protected computer network using electrical connections that physically isolate the protected network from external computer networks, such as the Internet.

Wireless mesh networks typically include various mesh devices commonly characterized as access points or wireless nodes. In certain instances, devices known as wireless portals may implement the security filtering functionality of a firewall. These portals also commonly communicate wirelessly with one or more wireless access points. Wireless access points may perform functions consistent with a portal (or wireless mesh portal) that receives 802.11 communications from a plurality of wireless mesh points. Wireless mesh portals also communicate with other devices over another type of communication network, where wireless mesh points typically only communicate with other devices using only one type of communication network. In such a network, wireless mesh points may communicate with other mesh points and with computers using only 802.11 communications. Both mesh points and mesh portals are both commonly referred to as "mesh devices" that include different functionality. Today, a number of wireless access points or nodes in a wireless network may vary significantly. For example, a first wireless network may include two wireless access points and a second wireless network may include dozens of wireless access points. Wireless networks configured to switch communication traffic between different wireless access points are commonly referred to as wireless mesh networks, where individual access points may be referred to as mesh nodes, mesh points, or mesh portals. The ability for switching communication traffic allows hubs, routers, or switches included in conventional wired networks to be bypassed as each individual mesh node may perform functions consistent with a legacy hub, router, or switch.

In a wireless mesh network, typically all wireless communication traffic is passed through a few (one or more) wireless mesh portals and many wireless mesh points. In certain instances, this can lead to an imbalance in a wireless network. For example, in instances where wireless mesh portals perform functions consistent with a firewall, more resources of the relatively few portal devices may be dedicated to security functions. This can cause the mesh portals to spend less than an optimal amount of resources performing their primary function of keeping communications flowing through the wireless network. This can occur when processors at these portals are not powerful enough to keep up with both communication traffic and security function processing. This imbalance can lead to wireless portals becoming a performance bottleneck that slows the flow of communication data through the network. What are needed are new forms of computer network security methods and apparatus that protect wireless networks in manageable ways that do not slow communications in the wireless network.

Furthermore, various different vendors provide wireless links that allow wireless data communications to be switched between different pieces of computer hardware as needed. Communications may initially be passed via a first wireless portal and those communications may switch to being passed via a second wireless access portal when the first wireless portal fails or when that first wireless portal becomes heavily loaded. In other instances, communications may be switched from a first mesh node to a second wireless mesh node when a mobile device is physically moved from one place to another. This movement may cause communications from that mobile device to be switches from a first mesh portal to a second mesh portal. In an instance when a particular mesh node that stores information necessary to perform a security function fails, another mesh node may be configured to assume the responsibilities of the first mesh node. This can lead to a temporary reduction in network performance as the mesh node that assumed the responsibility of the first mesh node may have to receive data as it is configured. As such, what are needed are methods that allow different mesh nodes to store information relating to a security function in a way that distributes security workloads through different devices that may include both mesh portals and mesh points in a wireless mesh network.

SUMMARY OF THE CLAIMED INVENTION

The presently claimed invention relates to a method, a non-transitory computer readable storage medium, and a system executing functions consistent with the present disclosure for allowing or blocking access to digital content based on an evaluation. A method consistent with the presently claimed invention may receive a data access request via a wireless communication, where the request is then sent to a security computer that evaluates the request. After the request is received by the security computer a response may be received from the security computer that identifies that the request is associated with a bad content rating and access to the requested data may be blocked based on the bad content rating. After the data associated with the request is received at a node of the wireless network, information that cross-references an identifier of the requested data may be stored in a cache memory of the node and the node may then pass a message regarding the request wirelessly to another computing device.

When the method of the presently claimed invention is performed as a non-transitory computer-readable storage medium, a processor executing instructions out of a memory may perform a method consistent with the present disclosure, here again the method may include receiving a data access request via a wireless communication, where the request is then sent to a security computer that evaluates the request. After the request is received by the security computer a response may be received from the security computer that identifies that the request is associated with a bad content rating and access to the requested data may be blocked based on the bad content rating. After the data associated with the request is received at a node of the wireless network, information that cross-references an identifier of the requested data may be stored in a cache memory of the node and the node may then pass a message regarding the request wirelessly to another computing device.

A system consistent with the present disclosure may include a wireless node that receives a request to access digital data, a computer that performs a security function associated with the digital data, and a cache memory of the wireless node that stores information that cross-references an identifier of the digital data with the bad content rating. After the wireless node stores the cross-referenced information, it may send a message that includes that information to another computing device.

DETAILED DESCRIPTION

Figure 1:
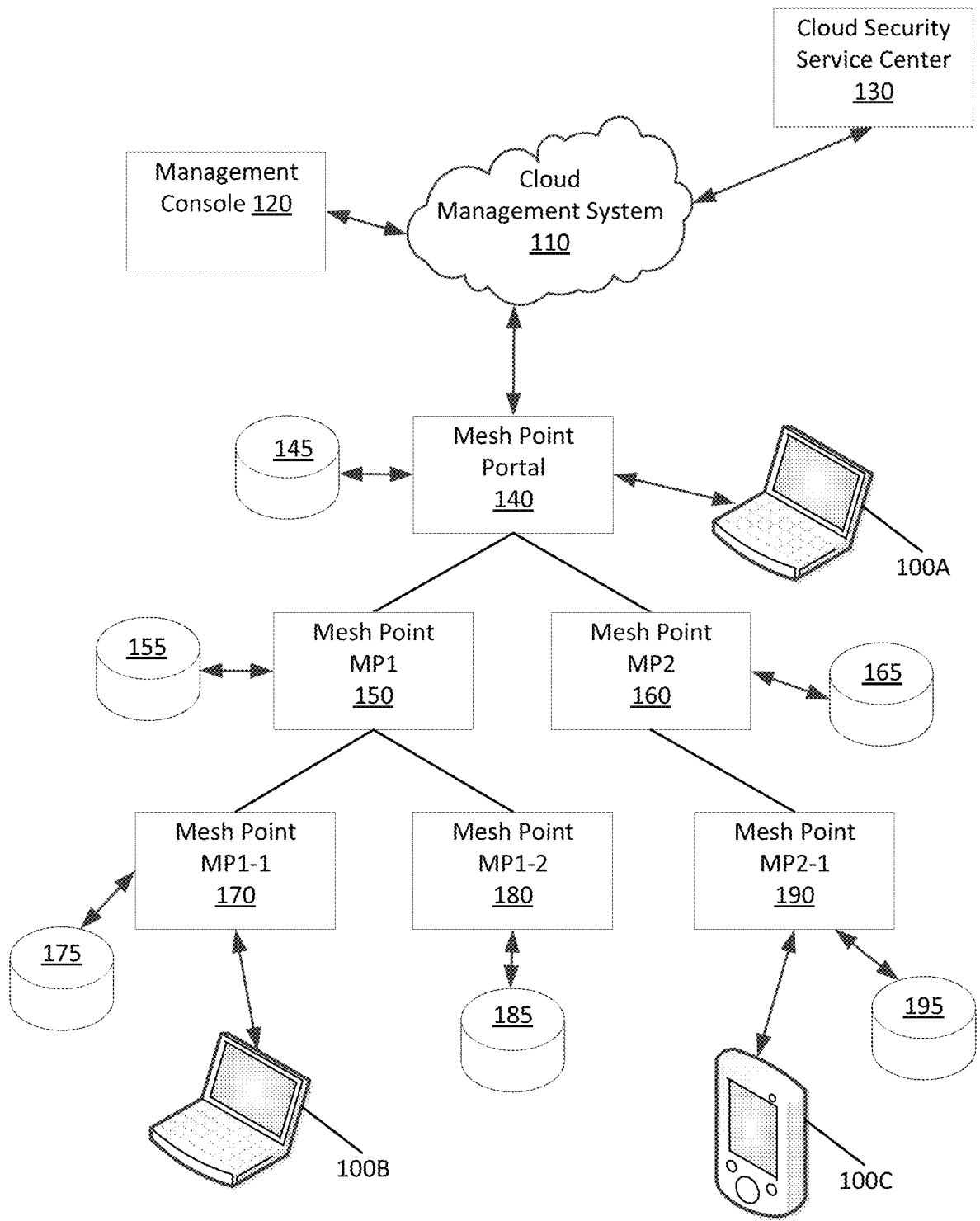
FIG. 1 illustrates elements of a wireless mesh network that communicates with a cloud management system.

The present disclosure is directed to distribute processing capabilities throughout different nodes in a wireless mesh network. Methods and apparatus consistent with the present disclosure increase the efficiency of communications in a wireless mesh network because they help minimize the need to forward communications to other nodes in the wireless mesh network such that an evaluation can be performed. Apparatus and methods consistent with the present disclosure may distribute ratings or verdicts associated with previous requests to access data to different nodes in a wireless mesh network without generating additional wireless communications through the wireless mesh network. Apparatus and methods consistent with the present disclosure perform a load balancing function because they distribute content ratings to different nodes in a wireless network without increasing messaging traffic.

Methods consistent with the present disclosure may identify a rating associated with digital data that was requested from a computer. For example, a computer may send a request when a user of that computer wishes to view a website. That request may be passed through one or more mesh nodes and methods consistent with the present disclosure may identify that the requested website is associated with either a good or a bad content rating. After the content rating has been identified, a response message may be sent back to the requesting computer via the one or more mesh nodes that originally passed the website access request. As these response messages are passed back to the requesting computer, each of the respective mesh nodes that pass the response message may store the rating of the website in a respective cache memory. The data stored in the caches of each of these mesh nodes may include information that cross-reference data identifiers with content ratings. These data identifiers may identify a data source using a universal record locator (URL), a domain name, a file name, or other information that identifies a data set or computer associated with a request. After a content rating is associated with a particular website, each of the mesh nodes that received the response message associated with the website request can identify the rating of that website without communicating with another wireless mesh node. In an instance where a subsequent request is received from the requesting computer or another requesting computer to access that same website, a mesh node that received that subsequent request may identify the rating of the website by accessing its own local cache memory. This process allows each mesh node of a plurality of mesh nodes to block subsequent access requests to websites that are assigned a bad reputation.

In certain instances mesh portals consistent with the present disclosure may wirelessly communicate with a plurality of wireless mesh points and may communicate over a wired network. As such, a mesh portal may be act as a gateway between wireless mesh points and a wired local area network, for example. In such instances a mesh portal may broadcast transmissions that include a mesh identifier (MSSID) and a cluster name that advertise the wireless network to mesh points that are configured to operate as members of a particular wireless mesh network. In other instances, a mesh point may include a cellular (e.g. 3G, 4G, LTE, or 5G) link or more than one mesh node in a mesh network may be configured to operate as a redundant mesh point that uses a wired or a wireless network connection.

The terms "access point" or "wireless access point" in the present disclosure refer to a device that may be wirelessly communicatively coupled to a computer directly without wireless communications passing through another wireless device. As such, the terms "access point" or "wireless access point" may refer to either a mesh portal or mesh point, the terms mesh portal relates to a wireless device that performs functions that a mesh point need not perform. Both mesh portals and a mesh points may perform functions consistent with a wireless access point because both mesh portals and mesh points may act as a wireless access point that directly wirelessly communicates with a computer in just a single hop, without wireless communications passing through another wireless device. The terms mesh node in the present disclosure may be used to refer to either a mesh portal or a mesh point that uses wireless communications to transmit and receive wireless computer network messages and data.

Typically the terms "firewall" or "gateway" in the present disclosure refer to computing devices that communicate over wired network connections. In certain instances, however, a mesh node may include functionality consistent with a firewall or gateway. In certain instances, functions conventionally associated with a firewall or gateway may be performed by a mesh portal or by mesh point. In these instances, a mesh portal or a mesh point may perform functions consistent with evaluating content ratings, deep packet inspection, or may include anti-virus program code.

FIG. 1 illustrates elements of a wireless mesh network that communicates with a cloud management system. FIG. 1 includes cloud management system 110, management console 120, cloud security center 130, mesh portal 140, mesh points (150, 160, 170, 180, & 190), mesh caches (145, 155, 165, 175, 185, & 190), and various computing devices (100A, 100B, & 100C). Communications between computing devices wireless devices 100A-100C may be configured to be transmitted wirelessly with any of the mesh points (150, 160, 170, 180, or 190) or with mesh portal 140 of FIG. 1. Mesh portal 140 may store data in mesh cache 145, mesh point 150 may store data in mesh cash 155, mesh point 160 may store data in mesh cash 165, mesh point 170 may store data in mesh cash 175, mesh point 180 may store data in mesh cash 185, and mesh point 190 may store data in mesh cash 195. Management console 120 may be a computing device or a user interface that allows administrators to set configurations or requirements of mesh networks.

Note that mesh points 150 and 160 are also referred to respectively as MP1 and MP2 this notation including a single number following a mesh point designator of "MP" indicates that mesh nodes 150 and 160 are located one wireless hop from mesh point portal 140. Note also that Mesh points 170, 180, and 190 are each located two hops from mesh point portal 140. These mesh points are also referred to respectively as MP1-1, MP1-2, and MP2-1. Here the two numbers following the "MP" designator indicate that that mesh points must pass through two hops. The MP1-1 designation in FIG. 1 indicates that mesh point 170 is a first mesh point that is two hops from mesh point portal 140, where one of those hops includes mesh point MP1 150. The MP1-2 designation indicates that mesh point 180 is a second mesh point that is two hops from mesh portal 140, where one of those hops includes mesh point MP1 150. The MP2-1 designation in FIG. 1 indicates that mesh point 190 is a first mesh point that is two hops from mesh point portal 140, where one of those hops includes mesh point MP2 160.

FIG. 1 illustrates computing device 100A communicating with mesh point portal 140, computing device 100B communicating with mesh point 170, and computing device communicating with mesh point 190. Note that communications from computing device 100A are passed directly to mesh point portal without having to pass through another wireless mesh device. Communications from computing device 100B and 100C each have to pass through two mesh points before reaching mesh point portal 140 (a total of 3 hops that include device to a first mesh point—first mesh point to a second mesh point—and second mesh point to a mesh portal).

Whenever a particular mesh point receives a request to access a website or data stored at the internet, that request may be passed through other mesh points, and through a mesh portal, such as mesh portal 140 of FIG. 1. Mesh portal 140 may then pass the request via cloud management system 110 to cloud security service 130 that may perform an analysis related to the requested website or internet data. Cloud security service 130 may perform any number of security checks on the website or received data. For example, cloud security service 130 may look up a reputation of a web site to see if that website has been assigned a bad reputation. Alternatively or additionally, cloud security service may perform other tests, such as a deep packet inspection (DPI) scan that looks for virus/malware patterns or run time code analysis that checks to see if requested data performs a nefarious act.

After a result is received from the cloud security service center 130, the result may be passed through each respective mesh node (mesh point portal or mesh point) until that result is passed back to the computing device that requested access to the website or internet data. As the result is passed through each respective mesh node, the result may be stored in a cache associated with each individual mesh node that the result message passed through. For example, mesh point portal 140 may store a received result in cache 145, mesh point 150 may store the result in cache 155, and mesh point 170 may store the result in cache 175 without increasing an amount of network traffic.

The information stored in the caches of FIG. 1 may be associated with a time-to-live time that may be set based on one or more rules received via management console 120 and may include a hash of access information (e.g. a universal record locator-URL) and a test result or verdict. This hash of information or other information associated with the results stored in a cache may then be deleted after the time-to-live time for that data has transpired. In certain instances a time-to-live time may be associated with a number of hops from a mesh portal. A greater number of hops may be associated with a lower time-to-live time value at each respective mesh point. As such a mesh portal may have a greatest time-to-live time and a mesh point located a maximum number of hops may have a lowest value of a time-to-live time for particular cache entries. In such an instance, when a redundant request is sent to a mesh point that recently purged entries in their cache may pass that request to another mesh node that still maintains information identifying a data source associated with the has been assigned a bad reputation. This could result in the mesh portal blocking the request and sending a message to the mesh point. Both the mesh portal and the mesh node may then update information stored at their respective cache memories that cross-references updated time-to-live indicators and bad reputation information. By having longer time-to-live time settings for nodes closest to a portal, the mesh portal will be less likely to send access requests to the security computer, while mesh nodes farther from the portal may be able to free cache memory to store other data. Administrators may also configure time-to-live times that cause certain parts of a network to retain cache entries longer than other parts of a network.

A particular time-to-live time may be stored in the cache memory used to cross-reference a request identifier and with a reputation. In certain instances, digital content that is considered undesirable may be assigned shorter time-to-live times than digital content that is associated with a threat. This may help limit an amount of work that is performed by a security computer. For example, the security computer may have to spend more time to identify that a particular set of requested data includes a virus than amount of time required to identify that a particular website is associated with undesired content. In this example, the security computer may have to test the requested data using a compute intensive sandboxing technique, where the identification that the particular website stores undesired data may be identified using a less compute intensive operation of parsing a list of URLs and ratings. As such, administrators may adjust time-to-live times for data stored in particular cache memories of mesh nodes according to a strategy that best fits their circumstances or preferences.

A mesh node may also store a start time associated with a particular time-to-live time such that the mesh node could more easily monitor when to delete particular entries from the cache memory. To identify when a particular entry should be deleted, all that need be done is to identify an amount of time that has transpired since an entry was stored in the cache and to see if that amount of time meets or exceeds the time-to-live time associated with that particular entry. Once the time-to-live for a particular entry has passed, that entry may be deleted from the cache.

The path along which wireless communications will pass in a wireless mesh network consistent with the present disclosure may be identified according to one or more conventions or rules associated with managing the wireless mesh network. Mesh portals may be initially configured as being a portal according to settings that may be received via management console 120 of FIG. 1. Some mesh points in a mesh network may also be capable of being promoted to assuming the responsibilities of a wireless mesh portal. Alternatively or additionally, designated mesh portals or promotable mesh points may each have the capability of communicating with other computing devices via at least two different types of wireless communication channels. For example, one communication channel may use 802.11 communications and a second channel may use a second type of wireless communication channel (e.g. a wireless cellular communication channel).

Rules associated with discovering an optimal path to send wireless data communications may cause wireless nodes to connect with other nodes based on signal strength measurements, error rate measurements, or signal to noise measurements. Alternatively these rules may be associated with initial administrator settings or a maximum number of hops to a mesh portal. Furthermore, the route that communications travel may be modified as network conditions change. For example, as relative signal strengths change, as transmission error rates change, or as signal to noise ratios change. Alternatively communication routes may be changed when devices fail or when certain nodes in the wireless network become congested. Congestion in a wireless network may be identified based on a number of user devices communicating with particular nodes increasing to or above a threshold amount number of user devices. Congestion may also be identified based on a total number of communications passed through a mesh node at particular points in time.

Figure 2:
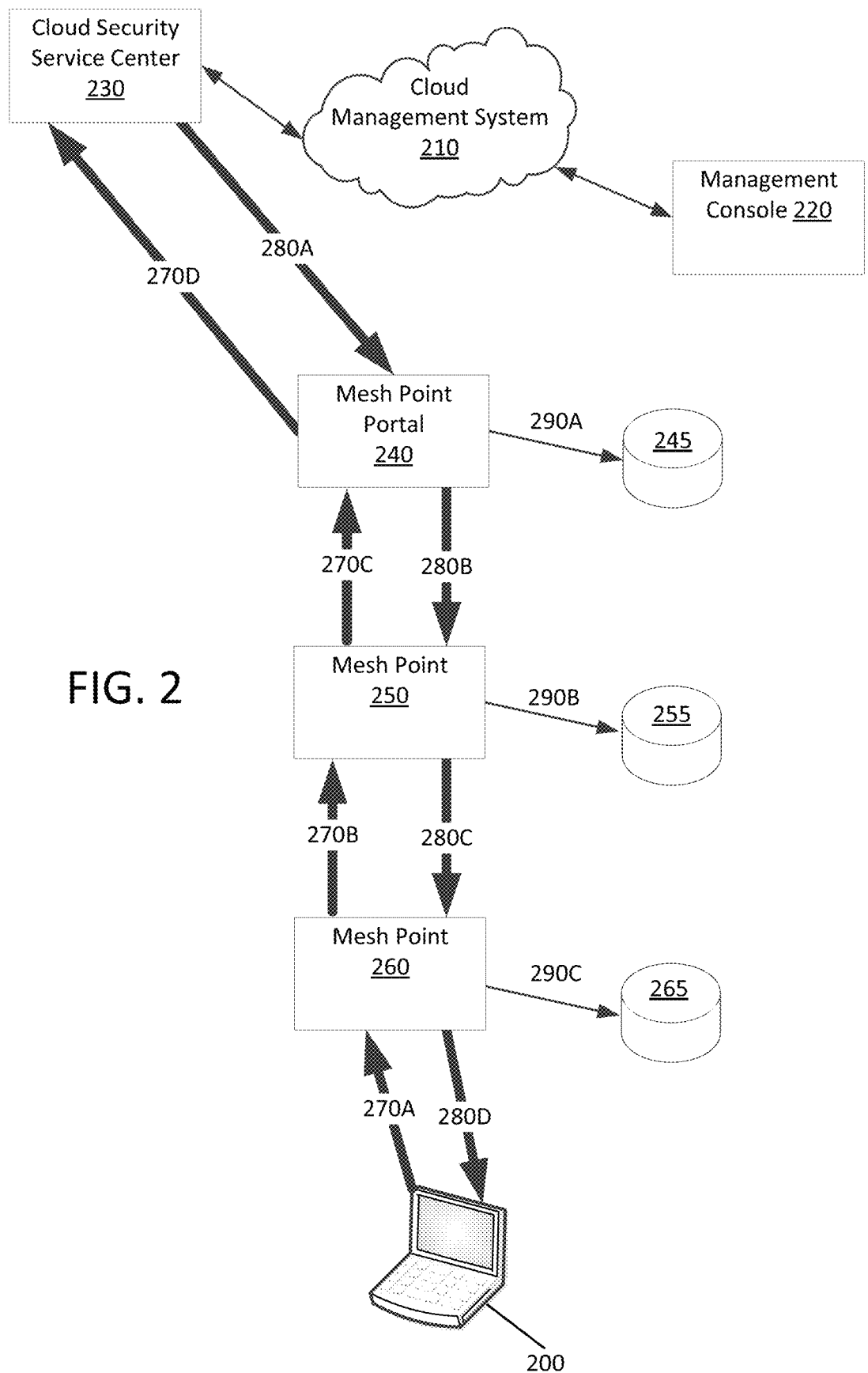
FIG. 2 illustrates communications that pass through different mesh devices and illustrates that each respective mesh device may store information in a cache memory regarding those communications.

FIG. 2 illustrates communications that pass through different mesh devices and illustrates that each respective mesh device may store information in a cache memory regarding those communications. FIG. 2 includes cloud management system 210, management console 220, cloud security service center 230, mesh point portal 240 that includes cache 245, mesh point 250 that includes cache 255, mesh point 260 that includes cache 265, and computing device 200. Requests such as request 270A may be sent to access a website from computer 200. Note that request 270A is passed through different mesh points (260 & 250) and through mesh portal 240. Note also that mesh point 260 passes the request to mesh point 250 via communication 270B, mesh point 250 passes the request to mesh portal 240 via communication 270C, and that mesh point portal 240 passes the request to cloud security service center 230 via communication 270D. As mentioned in respect to FIG. 1, cloud security service center 230 may perform a series of checks or tests when a computing device attempts to access a website or attempts to access data via the Internet.

After cloud security service center 230 performs checks or tests, a result may be received at mesh portal 240, then at mesh portal 250, then at mesh portal 260 as that response travels to computing device 200.

Here a set of communications 280A, 280B, 280C, and 280D relate to a response message originating from cloud security service center 230. Communications 280A, 280B, 280C, and 280D are passed through each respective mesh node (240, 250, & 260). As each respective mesh node receives the response message, each of those mesh devices may store result information in a respective cache. As such, mesh point portal 240 may store the result in cache 245 via cache access 290A, mesh point 250 may store the result in cache 255 via cache access 290B, and mesh point 260 may store the result in cache 265 via cache access 290C. After this result information has been stored in these different caches, any of the mesh devices (240, 250, or 260) that receives a subsequent request to access the previously requested content may identify whether the subsequent access request should be allowed or blocked based on the result stored in the respective caches. This means that subsequent requests for prohibited content would not have to be passed through another mesh device or to the cloud security service center 230. Instead, prohibited content could be blocked immediately. Alternatively, content identified as being allowed could be accessed without sending subsequent requests for the same content to cloud security service center 230. In certain instances, computer 200 may also store a list of web sites or web data that should be blocked and an application program operational at computer 200 may prevent other processes executing at computer 200 from sending requests for prohibited content based on the list of websites or web data that should be blocked.

Figure 3:
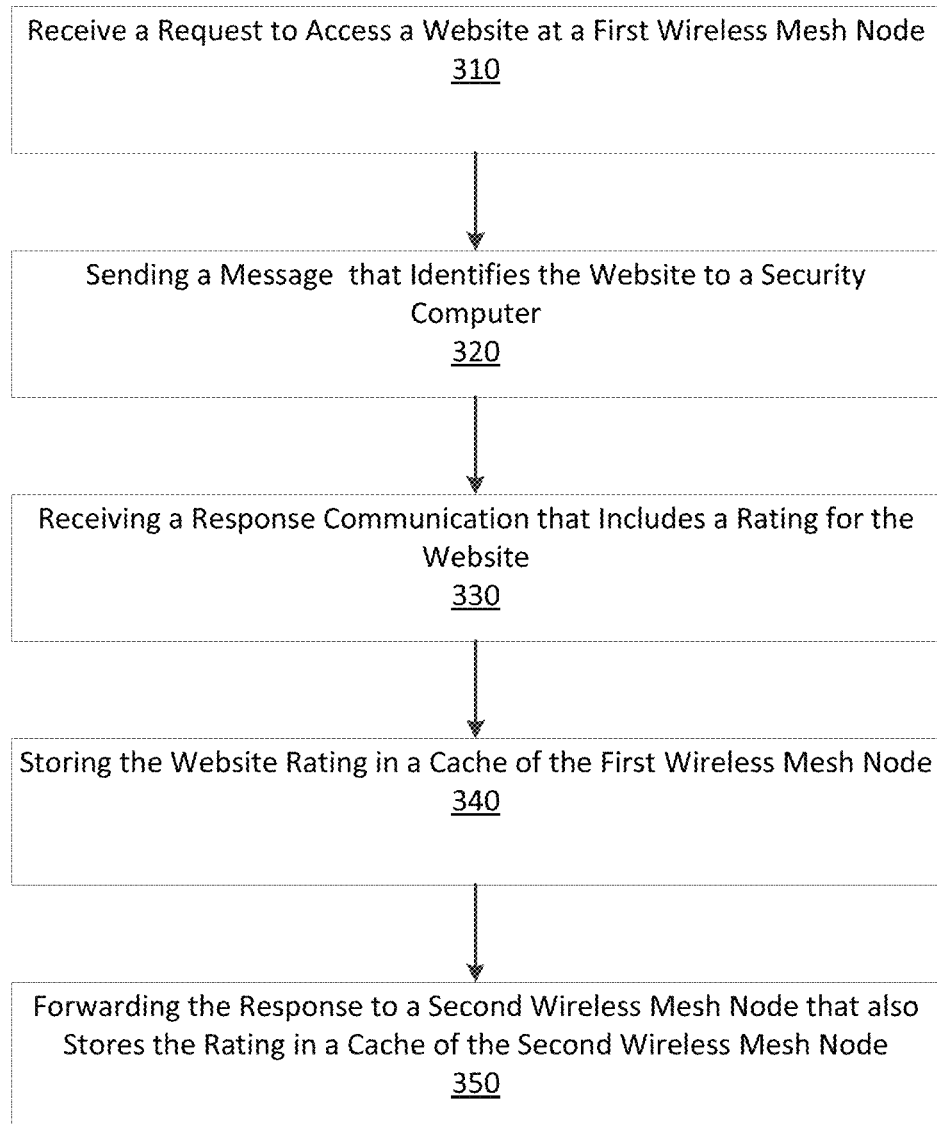
FIG. 3 illustrates a flow chart of steps that allow different mesh nodes to each store security related information such that any one of those different mesh nodes can perform a security function.

FIG. 3 illustrates a flow chart of steps that allow different mesh nodes to each store security related information such that any one of those different mesh nodes can perform a security function. FIG. 3 begins with step 310 where a first wireless mesh node receives a request to access a website or data that is stored at a computing device. The request received in step 310 of FIG. 3 may include a universal resource locator (URL) that identifies a website. Alternatively or additionally, this request may include a link, pointer, or instructions that cause a computer to send data to a requesting computer. After step 310, the first mesh node may send a message to a security computer that identifies the website or data stored at the computer in step 320 of FIG. 3. Next, in step 330 a response may be received at the first wireless mesh node that identifies a security rating associated with the website, with the requested data, with a domain, or with the computer that stores requested data.

While not illustrated in FIG. 3, the security computer after receiving the access request may access a database to look up the rating associated with the website with the requested data or with the computer that stores requested data. In an instance where no rating relating to the request is stored in the database, the security computer may access other databases that store rating information. Alternatively or additionally, the security computer could perform a series of tests on data retrieved from the website or computer. These tests could include, for example, deep packet inspection or antivirus scans. In certain instances, a test performed at a security computer may include interpreting or manipulating the received data as the security computer looks for suspicious or malicious activity performed by data received from the website or computer associated with the request. As such, the security computer may perform functions of checking to see whether requests are associated with computers that already are associated with a bad reputation or the security computer may perform more advanced analysis that could be performed by a firewall or a computer that evaluates computer data in a secure environment that is commonly referred to as a "sandbox." "Sandboxes" are computers that have the capability to access data, open files, or execute program code before that data, files, or program code can be accessed by a requesting computer. In the event that data, files, or program code received by the sandbox computer performs a suspicious or malicious act, the sandbox computer can be used to identify that the data, files, or program code should be assigned a bad rating before a requesting computer can be exploited or damaged by the suspicious or malicious act. As such, the security computer may be used to identify a reputation associated with an access request by various ways. In certain instances, various actions such as reputation look up, deep packet inspection, or sandboxing tests may be performed at one or more computing devices optimized to perform one or more particular security functions after the message is sent to the security computer in step 320 of FIG. 3.

After step 330 of FIG. 3, a processor at the first wireless mesh node may store information in a cache memory that includes the rating associated with the website, the requested data, or the computer that stores the requested data. The rating may be stored in a manner that cross-references the rating with a URL or other information that identifies requested data, a requested file, a domain, or information that identifies a computer associated with a particular request in step 340 of FIG. 3. The first wireless mesh node may then send (forward) the response with the rating to a second wireless mesh node in step 350 of FIG. 3. This second wireless mesh node may also store the rating in its own cache.

The rating may be stored in each respective cache of each respective mesh node that passes information relating to the request back to the computer that originally made the request. This method improves the efficiency of a wireless network because no additional message traffic may be required to share cache information between different mesh nodes along a path that traverses multiple mesh nodes.

Figure 4:
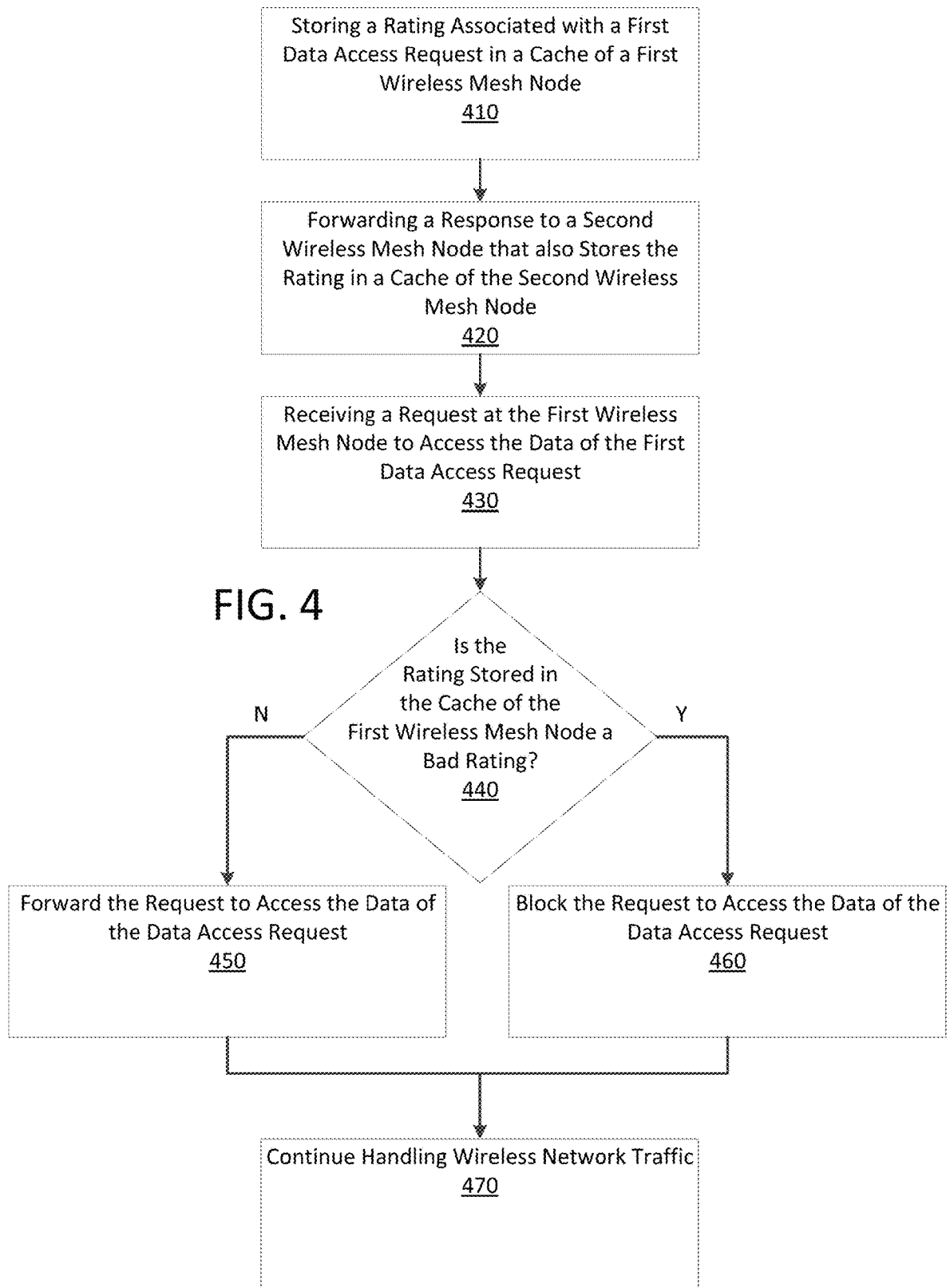
FIG. 4 illustrates a series of steps where any mesh node in a set of mesh nodes share the work of identifying whether a request for computer data is associated with a known rating or reputation.

FIG. 4 illustrates a series of steps where any mesh node in a set of mesh nodes share the work of identifying whether a request for computer data is associated with a known rating or reputation. FIG. 4 begins with step 410 where a rating associated with a first data access request is stored in a cache of a first wireless mesh node. The rating stored in step 410 may have been included in a response message associated with the first data access request. Note that the response message may traverse the same set of mesh nodes that the first data access request traversed. As such, a first computing device may have sent the first request to the second wireless access node, the second wireless access node may have forwarded that request to the first wireless access node, the first wireless access node may have forwarded that request to a security computer, and the security computer may have sent the response to the first wireless access node.

Next in step 420, the first wireless mesh node may forward the response to the second wireless mesh node that may also store the rating in a cache memory local to the second wireless mesh node. Next, the first wireless mesh node may receive a second request in step 430 of FIG. 4. Note that this second request may have been received directly from a requesting device without that request being passed through another mesh node. Determination step 440 may be performed by a processor at the first wireless mesh node that checks to see whether the requested data is associated with a bad rating stored in the cache of the first wireless mesh node. In the instance when the request is found to be associated with a bad rating or reputation, the processor at the first wireless mesh node may then prevent (block) the second request from being sent to another computing device in step 460 of FIG. 4. The first wireless mesh node may then inform the computer that sent the second request that the request was blocked due to the fact that the requested data is associated with the bad rating or reputation.

Note that the second request could have been for the same data that was requested in the first request and that each of the mesh nodes that passed the response associated with the first request response should have stored the rating in a respective cache memory. Because of this, any of the mesh nodes that passed the response can identify ratings associated with subsequent requests for the same data and block those subsequent requests without passing a subsequent request to another computing device. As such, the caching of rating information at different respective mesh nodes according to the present disclosure can reduce traffic in a wireless mesh network as part of a load balancing function.

When determination step 440 identifies that the request is not associated with a bad reputation, the request may be sent to other computing devices. Here again the request could be passed to a security computer for evaluation. Alternatively, a processor at the first mesh node may identify that the requested data is associated with a good reputation and the request message could be passed to a computer that provides the requested data. In such an instance, data included in the request message may be modified to include information that informs other mesh nodes or a firewall that the request is associated with a data source that has a good reputation. Because of this methods consistent with the present disclosure may also prevent security computers from receiving excessive communication traffic and from performing security tasks redundantly. In such an instance subsequent requests for good data may be sent to an external computer without sending that subsequent request to the security computer. After step 450 or step 460 of FIG. 4, program flow may move to step 470, where the first wireless access node continues handling network traffic.

Figure 5:
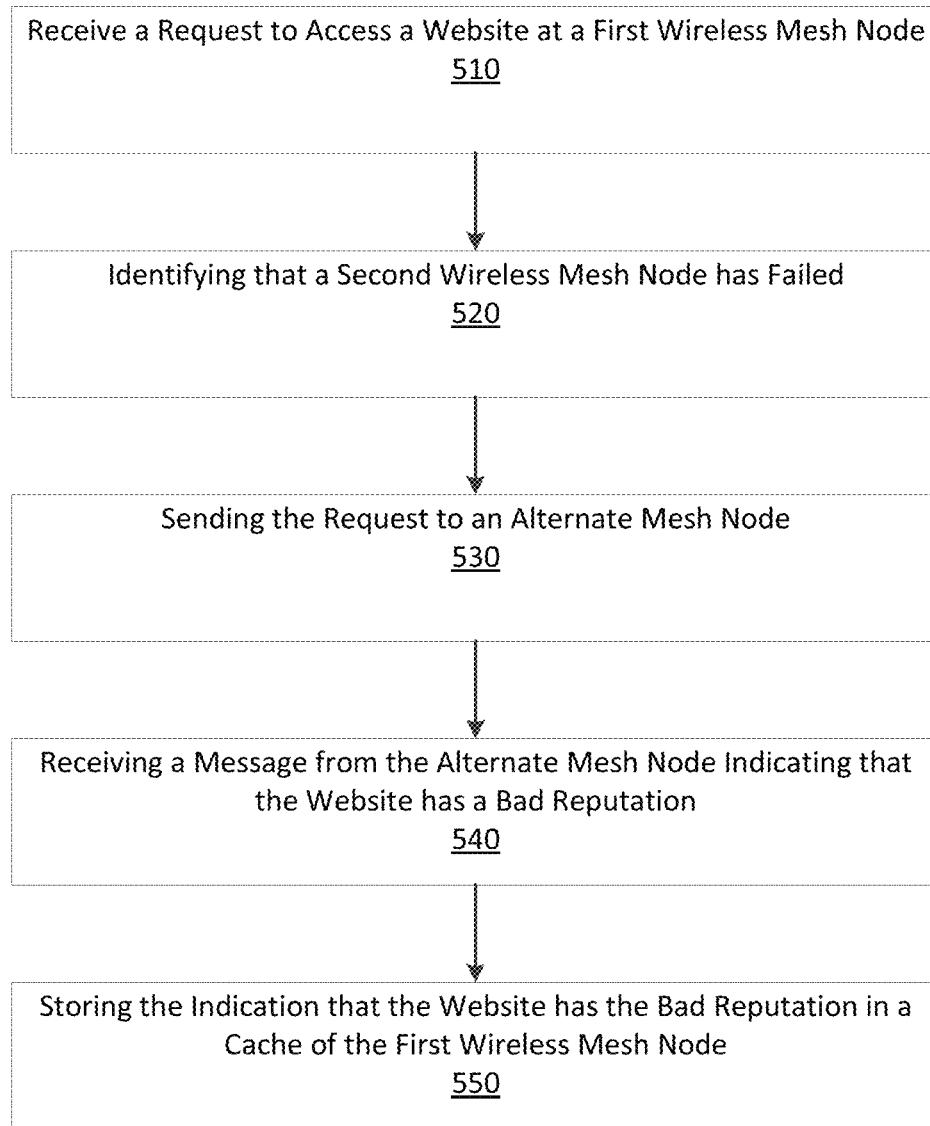
FIG. 5 illustrates a series of steps that may be performed at a mesh node when another mesh node in a set of mesh nodes has failed.

FIG. 5 illustrates a series of steps that may be performed at a mesh node when another mesh node in a set of mesh nodes has failed. Step 510 of FIG. 5 is a step where a request to access a website is received at a first wireless mesh node. Next the first wireless mesh node may identify that a second wireless mesh node has failed in step 520. The first wireless mesh node may then send the request to an alternate mesh node in step 530 of FIG. 3. After step 530, the first wireless mesh node may receive a message from the alternate mesh node in step 540 of FIG. 5 that indicates that the request is associated with a bad reputation. At the time the first mesh node received this message, a cache memory at the first wireless mesh node may not store information regarding a rating or reputation of the website access request of step 510 of FIG. 5. At this time, however, a cache memory of the alternate mesh node may store information that identifies a rating or reputation associated with the website access request. In an instance when the alternate mesh node identifies that the rating stored in its cache indicates that the website is associated with a bad reputation, the alternate mesh node machine may block the access request and may send a message back to the first mesh node that identifies that the access request was based on the bad reputation. Next, the message sent from the alternate mesh node may be received at the first mesh node in step 540 and the first mesh node may store an indication of the bad reputation in a cache memory of the first mesh node in step 550 of FIG. 5. While not illustrated in FIG. 5, the first wireless mesh node may then send a message back to a computer that originally sent the access request of step 510.

The steps of FIG. 5 illustrate that all caches of all mesh nodes in a large wireless mesh network may not store identical information. For example, the first mesh node may not have been a mesh node that previously forwarded an access request that identified the website requested in step 510. In such an instance, a previous request to access this same website may have been passed through a plurality of different mesh nodes that include the alternate mesh node. Furthermore, cache memories of each of those different mesh nodes may store information identifying the bad reputation of the website requested in step 510 of FIG. 1.

In certain instances, an application program executed by a computing device may also store reputation information of data accessible (e.g. websites, files, computer name/address, or domains) via a computer network. For example, a user computing device may store data that identifies previous requests made by the user computing device to access links associated with a bad reputation. Program code operational at this computing device could block any access request from the computing device without having to send that request to a wireless access point. Such a set of program code at the mobile device could reduce a number of communications passing through the wireless network by preventing bad access requests from being redundantly sent from a computing device.

In an instance when the computing device is mobile device is moved from one physical location to another in a wireless mesh network at a primary location (e.g. at the San Francisco Office) or at a another physical location (e.g. at the Los Angeles Office), requests from the mobile device may pass through different sets of wireless mesh nodes depending on a number of factors that include relative device locations, relative signal strengths, or an operational status of devices in a wireless mesh network. A redundant request sent from the mobile device to a website with a bad reputation if sent from the mobile device may traverse multiple hops in the wireless mesh network before an indication of the bad reputation were passed back to the mobile device. Program code operational at a mobile device may not only prevent such redundant requests for the same bad content from being sent from the mobile device as this program code could identify how many times the mobile device attempted to request the bad content. This program code could also be configured to provide a warning message to a user or may be configured to send messages regarding these redundant requests to a system administrator. For example a message may be sent to an administrator when more than a threshold number of redundant requests for bad data are sent from a mobile device. In such an instance, the user administrator may identify that this mobile device may have been compromised by malware and that device could then be quarantined from a network. This quarantining may include blocking that computer from accessing the network until that particular mobile device was scanned for viruses or otherwise analyzed.

Figure 6:
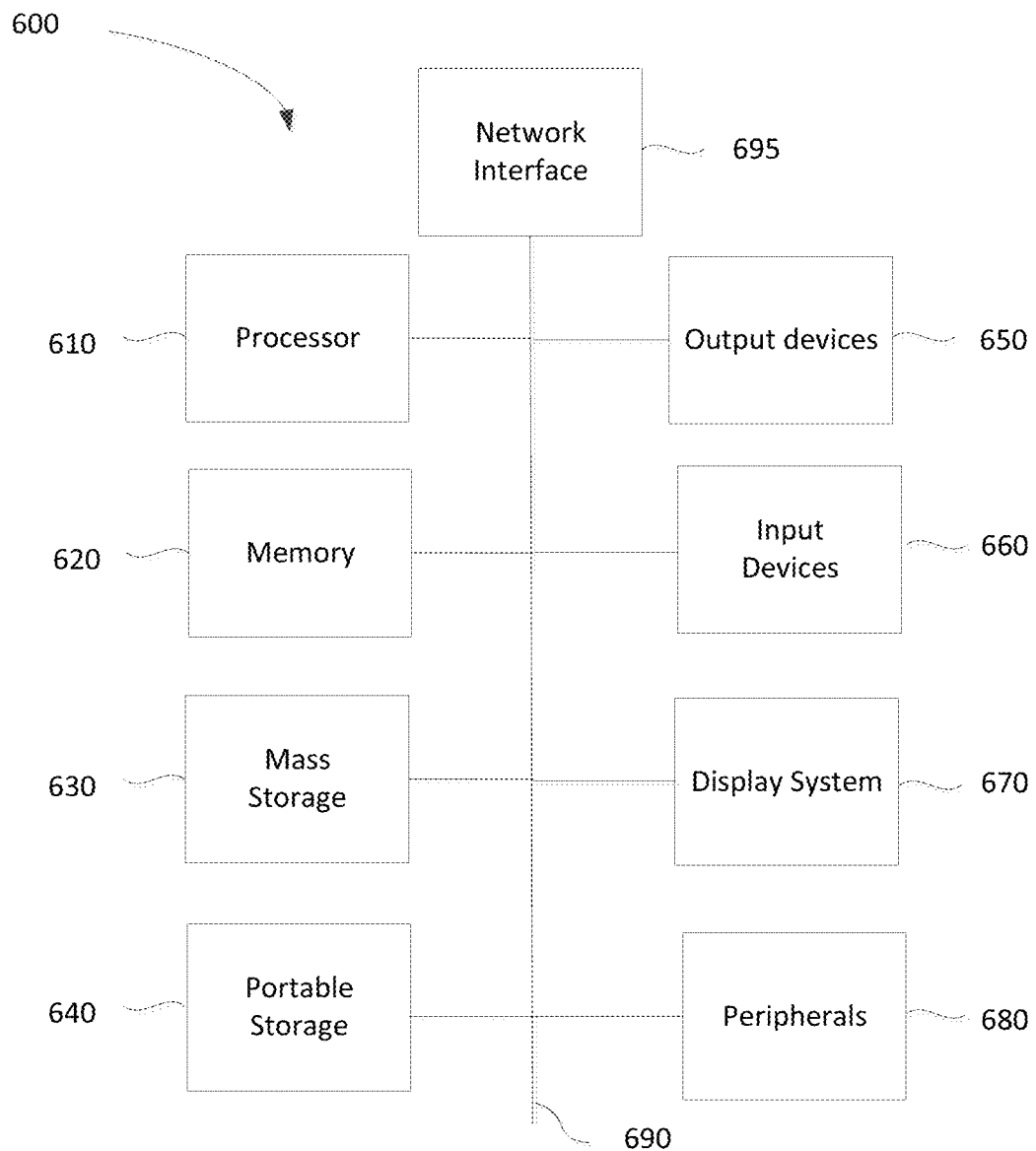
FIG. 6 illustrates a computing system that may be used to implement an embodiment of the present invention.

FIG. 6 illustrates a computing system that may be used to implement an embodiment of the present invention. The computing system 600 of FIG. 6 includes one or more processors 610 and main memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, peripheral devices 680, and network interface 695.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a FLASH memory, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

Network interface 695 may include any form of computer interface of a computer, whether that be a wired network or a wireless interface. As such, network interface 695 may be an Ethernet network interface, a BlueTooth™ wireless interface, an 802.11 interface, or a cellular phone interface.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 600 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for controlling network traffic in a wireless mesh network, the method comprising:
   receiving a request to access digital data at a first wireless mesh node, wherein a cache memory of the first wireless mesh node does not store information regarding the digital data;
   identifying that a second wireless mesh node having access to information regarding the digital data and to which the first wireless mesh node forwarded the request has failed;
   forwarding the request from the first wireless mesh node to a third wireless mesh node having access to the information regarding the digital data and following failure of the second wireless mesh node;
   receiving an indication from the third wireless mesh node that the request is blocked based on the requested digital data having a bad reputation rating indicated by stored information in a cache memory of the third wireless mesh node, wherein the bad reputation rating indicates at least one of the wireless mesh nodes is compromised by malware and that the at least one wireless mesh node is to be quarantined from the wireless mesh network;
   storing the indication that the requested digital data has the bad reputation rating at the cache memory local to the first wireless mesh node; and
   blocking a subsequent request to access the digital data, the subsequent request blocked by the first wireless mesh node based on the stored indication in the cache memory local to the first wireless mesh node.

2. The method of claim 1, further comprising:
   identifying a plurality of additional wireless mesh nodes in the wireless mesh network; and
   forwarding the indication of the bad reputation rating to the plurality of additional wireless mesh nodes, wherein each of the additional wireless mesh nodes stores the bad reputation rating in a respective cache memory local to the additional wireless mesh node, and wherein a subsequent request received by one or more of the additional wireless mesh node is blocked.

3. The method of claim 1, wherein a plurality of additional wireless mesh nodes is configured to access a computing device that stores reputation information, and wherein the computing device is configured to block an access request received by one or more of the plurality of additional wireless mesh nodes based on the reputation information without communicating with one or more of the wireless mesh nodes.

4. The method of claim 1, further comprising:
   identifying one or more redundant requests with the bad reputation rating at one or more of the first, second, or third wireless mesh nodes; and
   sending an indication regarding the redundant requests to a designated user device when a threshold number of the redundant requests with the bad reputation rating is reached.

5. The method of claim 1, further comprising storing information in the cache memory of the first wireless node that identifies a time-to-live for data stored at the cache memory of either of the first, second, or third wireless mesh nodes.

6. The method of claim 5, further comprising deleting the data stored at one or more of the wireless mesh nodes that associates the bad reputation rating with the digital data identifier after a time period that corresponds to or exceeds the time-to-live.

7. The method of claim 1, wherein the first wireless node is a mesh portal that sends the request to a security computer, wherein the security computer is configured to access a plurality of databases that store rating information.

8. The method of claim 7, wherein the security computer performs a plurality of tests on the request, the tests including interpreting or manipulating received data in the request or performing a deep packet inspection in a secure environment.

9. A non-transitory computer-readable storage medium having embodied therein a program executable by a processor for implementing a method for controlling network traffic in a wireless mesh network, the method comprising:
  receiving a request to access digital data at a first wireless mesh node, wherein a cache memory of the first wireless mesh node does not store information regarding the digital data;
  identifying that a second wireless mesh node having access to information regarding the digital data and to which the first wireless mesh node forwarded the request has failed;
  forwarding the request from the first wireless mesh node to a third wireless mesh node having access to the information regarding the digital data and following failure of the second wireless mesh node;
  receiving an indication from the third wireless mesh node that the request is blocked based on the requested digital data having a bad reputation rating indicated by stored information in a cache memory of the third wireless mesh node, wherein the bad reputation rating indicates at least one of the wireless mesh nodes is compromised by malware and that the at least one wireless mesh node is to be quarantined from the wireless mesh network;
  storing the indication that the requested digital data has the bad reputation rating at a cache memory local to the first wireless mesh node; and
  blocking a subsequent request to access the digital data, the subsequent request blocked by the first wireless mesh node based on the stored indication in the cache memory local to the first wireless mesh node.

10. The non-transitory computer-readable storage medium of claim 9, further comprising instructions executable to:
  identify a plurality of additional wireless mesh nodes in the wireless mesh network; and
  forward the indication of the bad reputation rating to the plurality of additional wireless mesh nodes, wherein each of the additional wireless mesh nodes stores the bad reputation rating at a respective cache memory local to the additional wireless mesh node, and wherein a subsequent request received by one or more of the additional wireless mesh node is blocked.

11. The non-transitory computer-readable storage medium of claim 9, wherein a plurality of additional wireless mesh nodes is configured to access a computing device that stores reputation information, and wherein the computing device is configured to block an access request received by one or more of the plurality of additional mesh nodes based on the reputation information without communicating with one or more of the wireless mesh nodes.

12. The non-transitory computer-readable storage medium of claim 9, further comprising instructions executable to:
  identify one or more redundant requests with the bad reputation rating at one or more of the first, second, or third wireless mesh nodes; and
  send an indication regarding the redundant requests to a designated user device when a threshold number of the redundant requests with the bad reputation rating is reached.

13. The non-transitory computer-readable storage medium of claim 9, further comprising instructions executable to store information in the cache memory of the first wireless mesh node that identifies a time-to-live for data stored at the cache memory of either of the first, second, or third wireless mesh nodes.

14. A system for controlling network traffic in a wireless mesh network, the system comprising:
  a communication interface that communicates over a communication network with a plurality of wireless mesh nodes of a wireless mesh network; and
  a processor that executes instructions stored in memory, wherein the processor executes the instructions to:
    receive a request to access digital data at a first wireless mesh node, wherein a cache memory of the first wireless mesh node does not store information regarding the digital data;
    identify that a second wireless mesh node having access to information regarding the digital data and to which the first wireless mesh node forwarded the request has failed;
    forward the request from the first wireless mesh node to a third wireless mesh node having access to the information regarding the digital data and following failure of the second wireless mesh node;
    receive an indication from the third wireless mesh node that the request is blocked based on the requested digital data having a bad reputation rating indicated by stored information in a cache memory of the third wireless mesh node, wherein the bad reputation rating indicates at least one of the wireless mesh nodes is compromised by malware and that the at least one wireless mesh node is to be quarantined from the wireless mesh network;
    storing the indication that the requested digital data has the bad reputation rating at the cache memory local to the first wireless mesh node; and
    block a subsequent request to access the digital data, the subsequent request blocked by the first wireless mesh node based on the stored indication in the cache memory local to the first wireless mesh node.

15. The system of claim 14, wherein the processor executes further instructions to:
  identify a plurality of additional wireless mesh nodes in the wireless mesh network; and
  forward the indication of the bad reputation rating to the plurality of additional wireless mesh nodes, wherein each of the additional wireless mesh nodes stores the bad reputation rating at a respective cache memory local to the additional wireless mesh node, and wherein a subsequent request received by the additional wireless mesh node is blocked.

16. The system of claim 14, wherein a plurality of additional wireless mesh nodes is configured to access a computing device that stores reputation information, and wherein the computing device is configured to block an access request received by one or more of the plurality of additional wireless mesh nodes based on the reputation information without having communicating with one or more of the wireless mesh nodes.

17. The system of claim 14, wherein the processor executes further instructions to:
   identify one or more redundant requests with the bad reputation rating at one or more of the first, second, or third wireless mesh nodes; and
   send an indication regarding the redundant requests to a designated user device when a threshold number of redundant requests with the bad reputation rating is reached.

\* \* \* \* \*